(12) United States Patent
Min

(10) Patent No.: US 7,469,970 B2
(45) Date of Patent: Dec. 30, 2008

(54) REINFORCING STRUCTURE FOR THREE-POINT TYPE SEAT BELT

(75) Inventor: Byeong Joon Min, Hwaseong-si (KR)

(73) Assignee: Kia Motors Corporation, Seoul (KR)

( * ) Notice: Subject to any disclaimer, the term of this patent is extended or adjusted under 35 U.S.C. 154(b) by 411 days.

(21) Appl. No.: 11/299,352

(22) Filed: Dec. 8, 2005

(65) Prior Publication Data
US 2007/0096533 A1 May 3, 2007

(30) Foreign Application Priority Data
Nov. 3, 2005 (KR) .................... 10-2005-0105005

(51) Int. Cl.
*B60R 21/00* (2006.01)
(52) U.S. Cl. .................... 297/470; 297/216.1
(58) Field of Classification Search .......... 297/216.1, 297/452.18, 468, 470, 483, 463.1; 280/808, 280/801.1
See application file for complete search history.

(56) References Cited

U.S. PATENT DOCUMENTS

| | | | | |
|---|---|---|---|---|
| 7,036,878 B2* | 5/2006 | Masutani | .................. | 297/216.1 |
| 7,063,389 B2* | 6/2006 | Kennedy, Sr. | ................ | 297/483 |
| 2005/0269846 A1* | 12/2005 | Vits et al. | ................. | 297/216.1 |
| 2006/0055227 A1* | 3/2006 | Canteleux | .................... | 297/470 |

FOREIGN PATENT DOCUMENTS

| | | |
|---|---|---|
| EP | 1 498 300 A1 | 1/2005 |
| JP | 09-071166 | 3/1997 |
| JP | 2004-025940 | 1/2004 |

* cited by examiner

*Primary Examiner*—Milton Nelson, Jr.
(74) *Attorney, Agent, or Firm*—Morgan, Lewis & Bockius LLP

(57) ABSTRACT

A reinforcing structure for a three-point type seat belt can be installed to a double seat in such a manner that a seat belt fixing bracket attached to the double seat is also united with a seat frame of a single seat disposed near the double seat, thereby securing a sufficient strength for the three-point type seat belt without the requirement of another reinforcing structure. In the reinforcing structure, the first second extension brackets are affixed to single and double seats respectively, while the first extension bracket is united with the second extension bracket.

5 Claims, 2 Drawing Sheets

REINFORCING STRUCTURE FOR THREE-POINT TYPE SEAT BELT

CROSS-REFERENCE TO RELATED APPLICATION

This application is based on and claims priority to Korean Patent Application 10-2005-0105005 filed in the Korean Intellectual Property Office on Nov. 3, 2005, the entire content of which is incorporated herein by reference.

FIELD OF THE INVENTION

The present invention relates to a seat belt for a vehicle, and more particularly to a reinforcing structure for a three-point type seat belt which can be installed between two seat frames in a vehicle.

BACKGROUND OF THE INVENTION

Generally, a vehicle has front seats and rear seats. A passenger vehicle, such as a recreation vehicle, tends to have more rows of seats. These seats include a seat cushion in which a passenger or passengers are seated, and a seat back against which the passenger or passengers rest. In some cases, the seat back provided with a headrest against which the passenger's head rests. The headrest is installed so as to be drawn up from the seat back.

Generally, a seat belt functions to secure a passenger in his or her seat and functions as safety equipment for protecting a driver and a passenger or passengers against the stress which may be due to impact during a car accident, such as rear-end collision, collision, overturn of a car, or a sudden stop of the car.

SUMMARY OF THE INVENTION

An embodiment of the present invention provides a reinforcing structure for a three-point type seat belt that may be installed to a double seat in such a manner that a seat belt fixing bracket attached to the double seat is also united with a seat from of a single seat disposed near the double seat, thereby securing strength of the three-point type seat belt without use of a separate reinforcing structure.

In one embodiment, there is provided a reinforcing structure for a three-point type seat belt installed to a double seat disposed at a rear of a vehicle, which includes a first extension bracket having one end affixed to a lower portion of a double seat fixing bracket and the other end having a fixing portion and a second extension bracket having one end affixed to a lower portion of a single seat fixing frame for fixing a single seat disposed near the double seat to the vehicle and the other end having an inserting portion configured to be fixedly inserted into the fixing portion of the first extension bracket. The fixing portion of the first extension bracket may have a U-sectional shape. The fixing portion of the first extension bracket has an inner width equal to or less than a thickness of the inserting portion of the second extension bracket.

BRIEF DESCRIPTION OF THE DRAWINGS

The above and other objects, features, and advantages of the present invention will be more apparent from the following detailed description taken in conjunction with the accompanying drawings, in which.

DETAILED DESCRIPTION OF THE PREFERRED EMBODIMENT

Hereinafter, a preferred embodiment of the present invention will be described with reference to the accompanying drawings.

Large-size vehicles, such as recreation vehicles or passenger vehicles, typically have rear seats, which include a single seat for a person and a double seat for two people, which are arranged near each other. The arrangement of the seats is shown in FIG. 1.

Figure 1:
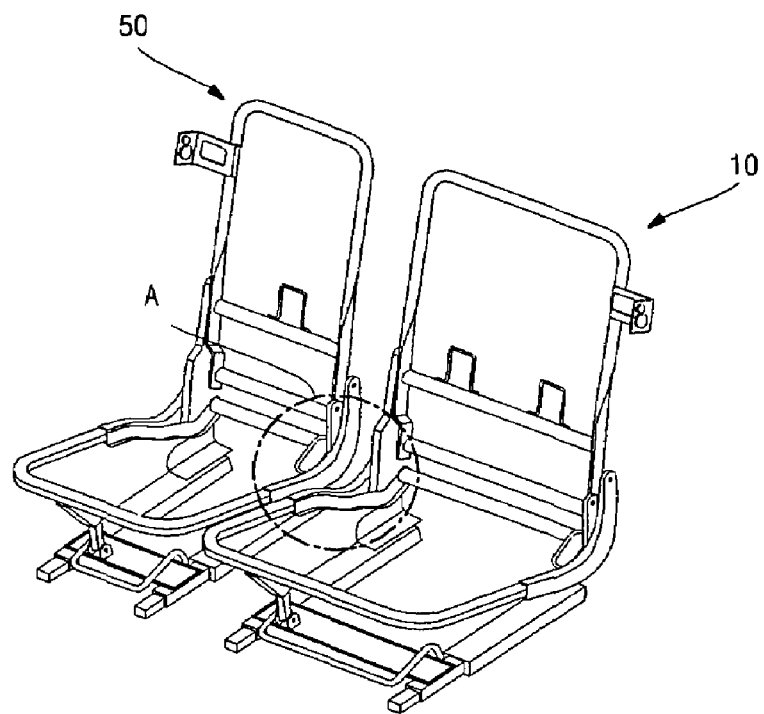
FIG. 1 is a perspective view showing a reinforcing structure for a three-point type seat belt according to an embodiment of the present invention.
Figure 2:
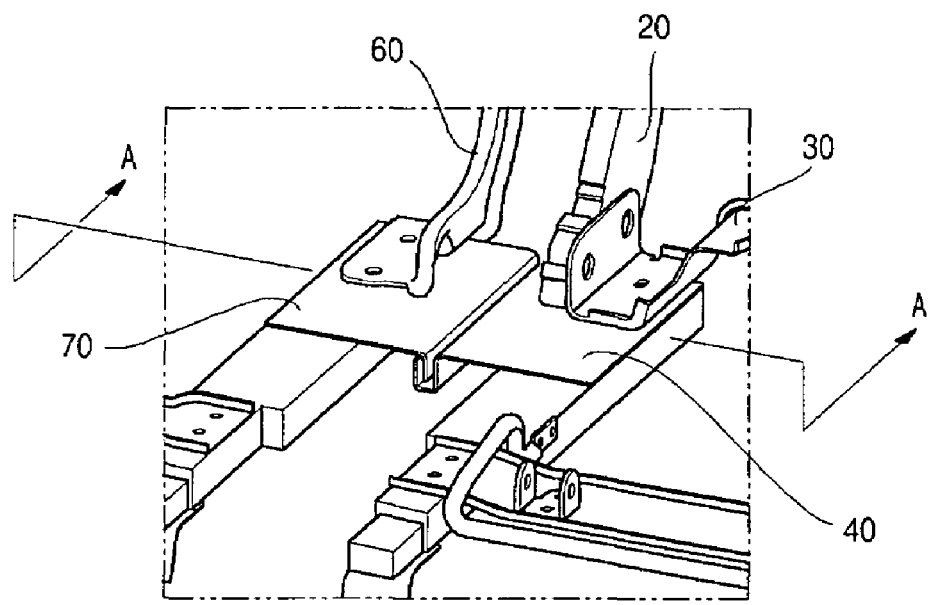
FIG. 2 is a magnified detailed view showing the reinforcing structure of the three-point type seat belt according to the embodiment of the present invention, in which the reinforcing structure is indicated by a dotted-line circle in FIG. 1.
Figure 3:
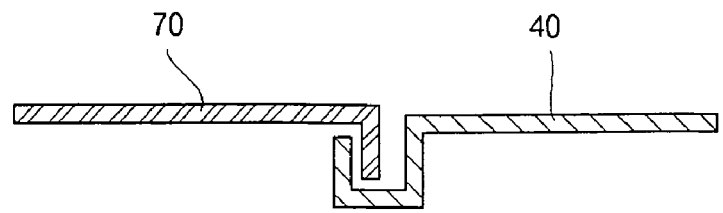
FIG. 3 is a cross-section view illustrating a combination of both first and second extension brackets of the reinforcing structure for the three-point type seat belt according to the embodiment of the present invention.
Figure 4A:
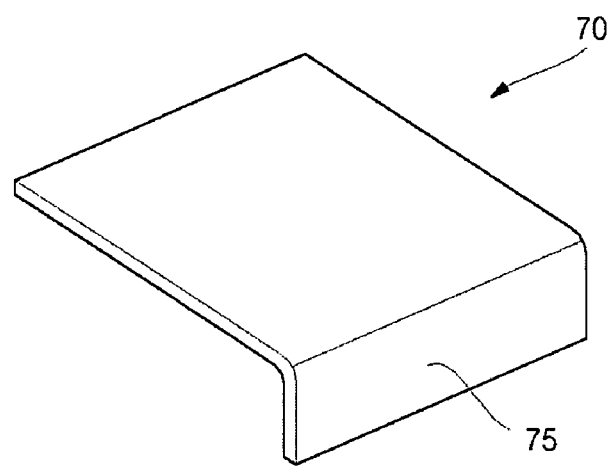
FIG. 4A is a perspective view illustrating the first extension bracket of the reinforcing structure for the three-point type seat belt according to an embodiment of the present invention.
Figure 4B:
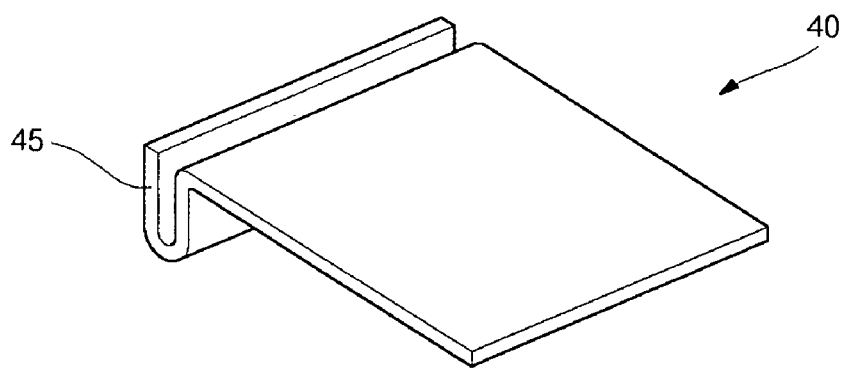
FIG. 4B is a perspective view illustrating the second extension bracket of the reinforcing structure for the three-point type seat belt according to an embodiment of the present invention.

FIG. 1 is a perspective view showing a reinforcing structure for a three-point type seat belt according to an embodiment of the present invention. FIG. 2 is a magnified detailed view of the area indicted in FIG. 1 showing the reinforcing structure for the three-point type seat belt according to an embodiment of the present invention. The reinforcing structure for the three-point type seat belt includes a first extension bracket 40 affixed to a lower portion of a double-seat 10 fixing bracket 30 and a second extension bracket 70 affixed to a lower portion of a single seat 50 on fixing frame 60. The second extension bracket 70 may be coupled to the first extension bracket 40.

One end of the first extension bracket 40 is affixed to the lower portion of the double-seat fixing bracket 30. The other end of the first extension bracket 40 includes a fixing portion 45, which may be configured in a U-shape. One end of the second extension bracket 70 is affixed to the lower portion of the single seat fixing frame 60, and the other end includes an inserting portion 75 configured to be inserted in the fixing portion 45 of the first extension bracket 40.

Furthermore, the single seat 50 and double seat 10 may have their own seat belts, respectively. As shown in FIG. 2, the seat belt fixing brackets for fixing the seat belt are respectively installed to a lower portion of each seat frame.

As described above, when the seat belt fixing brackets are installed, one end of the first extension bracket 40 may be integrated with the lower portion of the double seat frame 20 of the double seat 10 which the seat belt fixing bracket 30 is mounted. The opposing end of the first extension bracket 40 may include U-shaped fixing portion 45.

The planar surface of the second extension bracket 70 is attached to the lower portion of the frame for the single seat 50 on the lower portion of the single seat frame 60 and the double seat 10 is configured to be assembled adjacent to the single seat 50. Further, the second extension bracket 70 includes the inserting portion 75 formed at the opposing end. The inserting portion 75 of the second extension 70 may be configured in an inverted L-sectional shape.

While the single and double seats 50 and 10 which have the first and second extension brackets 40 and 70 respectively, are fixed to the vehicle, the inserting portion 75 which is formed at the other end of the second extension bracket 70 is inserted in the fixing portion 45 formed at the other end of the first extension bracket 40.

In order to increase coherence between the inserting portion 75 and the fixing portion 45 when the inserting portion 75 of the second extension bracket 70 is inserted into the fixing portion 45 of the first extension bracket 40, an embodiment of the present invention may include a fixing portion 45 with an inner width equal to or less than the thickness of the inserting portion 75. Furthermore, after the inserting portion 75 of the second extension bracket 70 is inserted into the fixing portion 45 of the first extension bracket 40, the inserting portion 75 may be welded to the fixing portion 40 by way of a spot-welding method.

In the case that the single seat 50 is fixedly connected to the double seat 10 as described above and that a passenger wears the three-point type seat belt, when a car accident, such as a collision occurs in which load is applied to the seat belt, the load applied to the seat belt is dispersed by the single seat frame 60 of the single seat 50 and the double seat frame 20 of the double seat 10. Thus, a separate reinforcing structure is not needed to reinforce the seat belt.

According to an embodiment of the present invention as described above, the reinforcing structure for the three-point type seat belt can be installed to the double seat in such a manner that the seat belt fixing bracket attached to the double seat also is united with the single seat frame of the single seat disposed near the double seat, thereby securing strength of the three-point type seat belt without use of a separate reinforcing structure.

While a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A reinforcing structure for a three-point type seat belt, comprising:

a first extension bracket having a first end affixed to a lower portion of a seat fixing bracket for fixing the seat belt to a lower end of a double seat, and a second end having a fixing portion; and a second extension bracket having a first end fixed to a lower portion of a single seat fixing frame for fixing a single seat disposed near the double seat to a vehicle, and a second end having an inserting portion bent, wherein the inserting portion of the second extension bracket is coupled to the fixing portion of the first extension bracket.

2. The reinforcing structure for the three-point type seat belt as claimed in claim 1, wherein the fixing portion of the first extension bracket has a U-sectional shape.

3. The reinforcing structure for the three-point type seat belt as claimed in claim 2, wherein the fixing portion of the first extension bracket has an inner width equal to or less than a thickness of the inserting portion of the second extension bracket.

4. The reinforcing structure for the three-point type seat belt as claimed in claim 1, wherein the fixing portion of the first extension bracket has an inner width equal to or less than a thickness of the inserting portion of the second extension bracket.

5. The reinforcing structure for three-point type seat belt as claimed in claim 1, wherein the inserting portion of the second extension bracket is inserted into the fixing portion of the first extension bracket.

* * * * *